(12) United States Patent
Fields et al.

(10) Patent No.: US 8,544,392 B2
(45) Date of Patent: Oct. 1, 2013

(54) RELEASABLE ENGAGEMENT APPARATUS

(76) Inventors: Jack Wynn Fields, Vidalia, GA (US); Pollyann Fields Martin, Vidalia, GA (US); Kathy Fields Moses, Uvalda, GA (US)

( * ) Notice: Subject to any disclaimer, the term of this patent is extended or adjusted under 35 U.S.C. 154(b) by 135 days.

(21) Appl. No.: 13/021,663

(22) Filed: Feb. 4, 2011

(65) Prior Publication Data
US 2012/0199052 A1    Aug. 9, 2012

(51) Int. Cl.
*A47B 9/00* (2006.01)
(52) U.S. Cl.
USPC .............. 108/146; 108/147.19; 248/409
(58) Field of Classification Search
USPC ............. 108/116, 144.11, 146, 147, 147.19; 248/161, 407, 408, 409, 414, 354.1, 354.6; 297/344.12, 344.18; 285/302, 303, 298; 292/1, 194, 195, DIG. 60
See application file for complete search history.

(56) References Cited

U.S. PATENT DOCUMENTS

| 328,023 | A | | 10/1885 | Glashan |
|---|---|---|---|---|
| 1,554,890 | A | | 9/1925 | William |
| 2,607,095 | A | | 8/1952 | Maasdam |
| 3,443,784 | A | * | 5/1969 | Walkinshaw ................. 248/408 |
| 3,712,574 | A | * | 1/1973 | Rothermel ..................... 248/409 |
| 3,715,997 | A | * | 2/1973 | Barth ............................ 108/146 |
| 3,976,016 | A | * | 8/1976 | Longbottom ................. 108/147 |
| 4,465,011 | A | | 8/1984 | Merry |
| 4,660,802 | A | | 4/1987 | Oscarsson |
| 5,364,163 | A | | 11/1994 | Hardison |
| 5,494,333 | A | * | 2/1996 | Wilson ...................... 297/344.18 |
| 5,894,805 | A | * | 4/1999 | Raasch et al. ................. 108/146 |
| 5,931,537 | A | | 8/1999 | Gollin et al. |
| 5,971,341 | A | | 10/1999 | Pfister |
| 6,095,607 | A | * | 8/2000 | Wenzel ..................... 297/344.18 |
| 6,832,784 | B1 | * | 12/2004 | Chen .................................. 285/7 |
| 6,857,378 | B2 | * | 2/2005 | Goodman et al. ........ 108/147.19 |
| 6,905,172 | B1 | * | 6/2005 | Barnett ..................... 297/344.12 |
| 8,128,306 | B2 | * | 3/2012 | Gorza ......................... 403/109.3 |
| 2003/0173475 | A1 | * | 9/2003 | Hsieh ............................ 248/161 |
| 2009/0194007 | A1 | * | 8/2009 | Pearson ........................ 108/116 |

(Continued)

FOREIGN PATENT DOCUMENTS

AU    2009100879        8/2009
AU    2009100879 A4    12/2009

(Continued)

OTHER PUBLICATIONS

Article entitled, "3D Model of Rope Clamp ascender device"; located at http://www.exchange3d.com/3D-Model-of-Rope-clamp-ascender-device/prodA_6362.html; accessed on Sep. 7, 2012; 2 pgs.

(Continued)

*Primary Examiner* — Darnell Jayne
*Assistant Examiner* — Daniel Rohrhoff
(74) *Attorney, Agent, or Firm* — Taylor English Duma LLP

(57) ABSTRACT

Disclosed is an engagement assembly for releasably engaging a rigid member, including a rotating member that releasably engages the rigid member to prevent movement of the rigid member in at least one direction by friction. The rotating member is forced by a biasing element to selectively engage the rigid member, preventing retraction of the leg and inhibiting extension of the leg. A control release interacts with the biasing element, providing a releasable engagement of the rotating member with the rigid member.

23 Claims, 9 Drawing Sheets

(56) References Cited

U.S. PATENT DOCUMENTS

| | | | |
|---|---|---|---|
| 2009/0206226 A1* | 8/2009 | Forrest et al. | 248/354.6 |
| 2010/0308196 A1* | 12/2010 | Lee | 248/353 |
| 2010/0314914 A1* | 12/2010 | Mazzola et al. | 297/16.2 |
| 2011/0239913 A1* | 10/2011 | Chung et al. | 108/146 |

FOREIGN PATENT DOCUMENTS

| | | |
|---|---|---|
| DE | 1946083 | 3/1971 |
| DE | 1946083 A1 | 3/1971 |
| DE | 3137984 | 4/1983 |
| DE | 3137984 A1 | 4/1983 |
| FR | 2695304 | 3/1994 |
| FR | 2695304 A1 | 3/1994 |
| GB | 2225715 | 6/1990 |
| GB | 2225715 A | 6/1990 |
| GB | 2239391 | 7/1991 |
| GB | 2239391 A | 7/1991 |
| GB | 2327872 | 2/1999 |
| GB | 2327872 A | 2/1999 |
| SU | 990998 A | 6/1981 |
| SU | 990998 | 1/1983 |

OTHER PUBLICATIONS

Article entitled: "Pole Clamp"; located at www.wrmed.com/downloads/pole_clamp.jpg; accessed on Aug. 25, 2010; 1 pg.

* cited by examiner

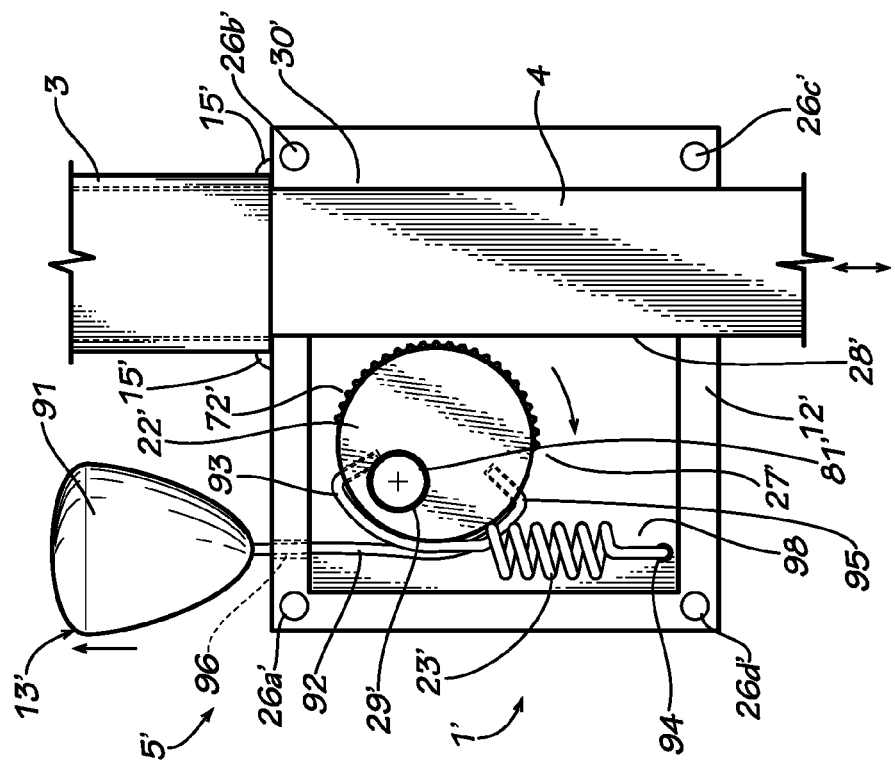
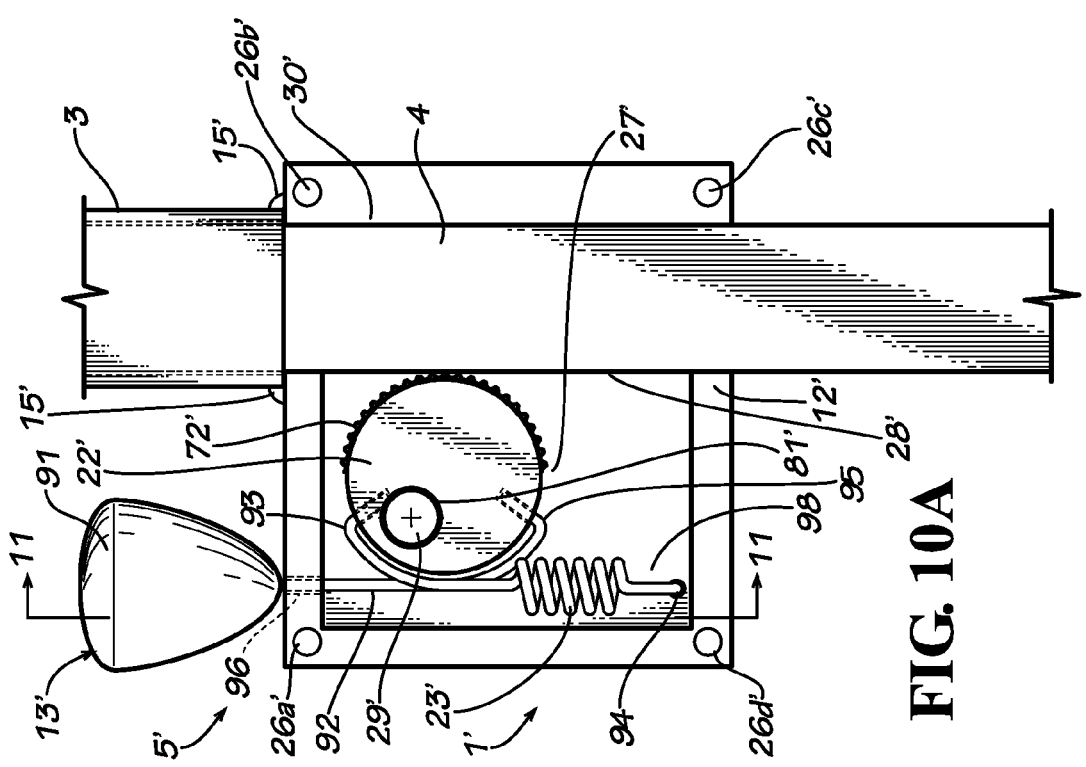
FIG. 10B
FIG. 10A

US 8,544,392 B2

RELEASABLE ENGAGEMENT APPARATUS

TECHNICAL FIELD

The present disclosure generally relates to mechanical member interaction, and, more particularly, relates to releasable engagement of a rigid member.

BACKGROUND

Uneven ground can make the use of chairs, tables, or other platforms greatly strained or even impossible. Because sitting locations are not always on flat ground, traditional chairs with legs of equal length can have uneven footing on rocky or unstable surfaces. Moreover, even if a traditional chair can maintain an even footing, the ground on which it sits may be sloped to a great enough degree that its use could be uncomfortable.

Although certain systems exist for extending and retracting rigid members, such as camera stands and other types of platforms, those systems are cumbersome and often require the user to operate the system with two hands or to expend greater amounts of force and energy than comfortable for their operation. Such cumbersome systems have also been employed in other applications of extending and retracting rigid members, such as the heightening of bicycle seats. Many of these systems also prevent motion in more than one direction, making a complete disengagement of the rigid member necessary to move the rigid member in any direction.

SUMMARY

The present disclosure describes an embodiment of an engagement assembly for releasably engaging a rigid member. The assembly includes a rotating member that releasably engages the rigid member to prevent movement of the rigid member in at least one direction by friction. The rotating member is forced to selectively engage the rigid member by a biasing element. A control release interacts with the biasing element to releasably engage the rotating member with the rigid member.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

FIG. 10A is a side view of an engagement apparatus in accordance with a second embodiment of the disclosure, with the cover removed and shown in an engaged position.

FIG. 10B is a side view of an engagement apparatus in accordance with a second embodiment of the disclosure, with the cover removed and shown in a released position.

DETAILED DESCRIPTION

It should be emphasized that the described embodiments are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The present disclosure describes various embodiments of an extension assembly for releasably engaging a rigid member.

Figure 1:
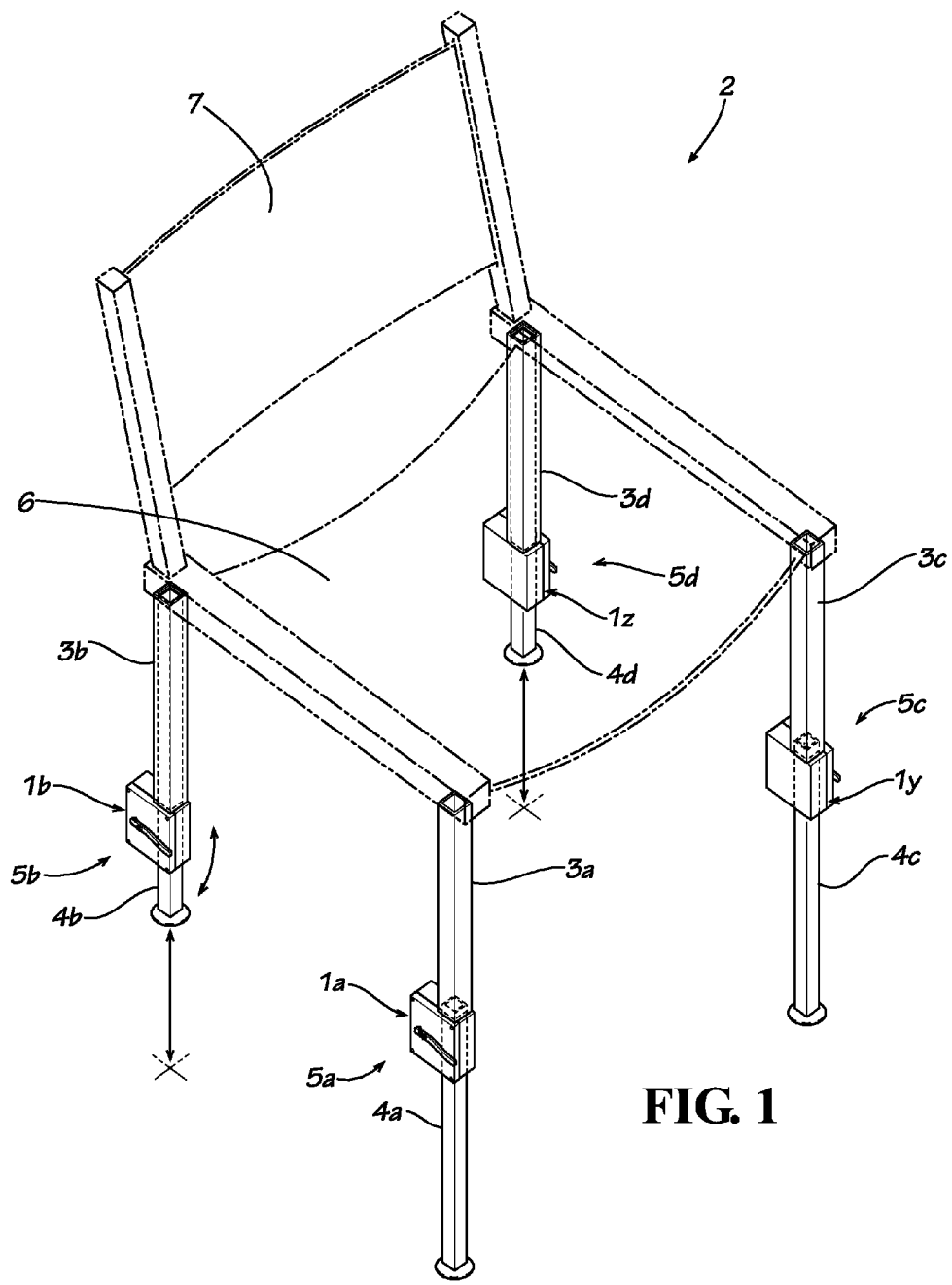
FIG. 1 is a perspective view of a chair with multiple leg assemblies, wherein each leg assembly includes an engagement apparatus in accordance with one embodiment of the disclosure.

Among other elements shown in dotted lines, FIG. 1 displays a chair 2 having a seat or platform 6, a back rest or back portion 7, and a plurality of legs or leg assemblies 5a,b,c,d. Each leg assembly 5a,b,c,d includes a telescoping lower leg or rigid member 4a,b,c,d as well as an upper leg or upper leg tube 3a,b,c,d connected to an embodiment of an engagement assembly 1a,b,y,z for releasably engaging the rigid member 4a,b,c,d. Embodiments of the engagement assembly 1a,b,y,z can exist in right hand form 1a,b or in left hand form 1y,z. As seen in FIG. 1, the chair 2 in FIG. 1 is shown with its rear leg assemblies 5b,d retracted to produce a shorter chair leg and its front leg assemblies 5a,c extended to produce a longer chair leg as would be suitable for use as a fishing chair on a bank.

Figure 2:
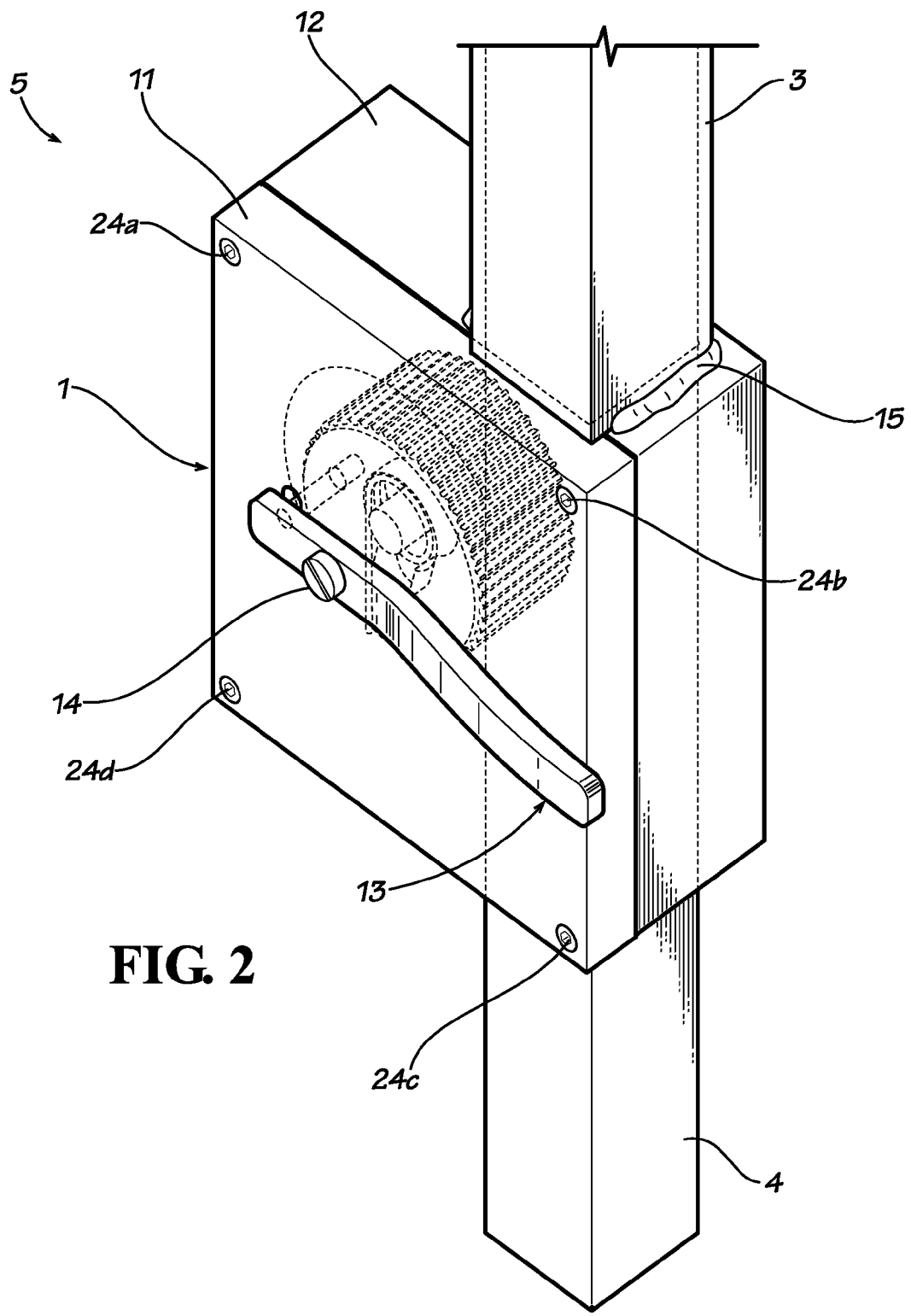
FIG. 2 is a close-up perspective view of the engagement apparatus of FIG. 1.

As seen in FIG. 2, the leg assembly 5 includes an engagement assembly 1 which itself includes a cover 11 and a device body housing 12 that are affixed together with attachment screws 24a,b,c,d. A control release 13 is rotably attached to the cover 11 by a machine screw 14 extending through the control release 13. The leg assembly 5 also includes the upper leg tube 3 that is affixed to the device body housing 12 of the engagement assembly 1 by welding 15. The welding 15 is shown only to the device body housing 12 so that the cover 11 may be removable. The leg assembly 5 also includes the rigid member 4 which may telescope within the engagement assembly 1 and the upper leg tube 3.

Figure 3:
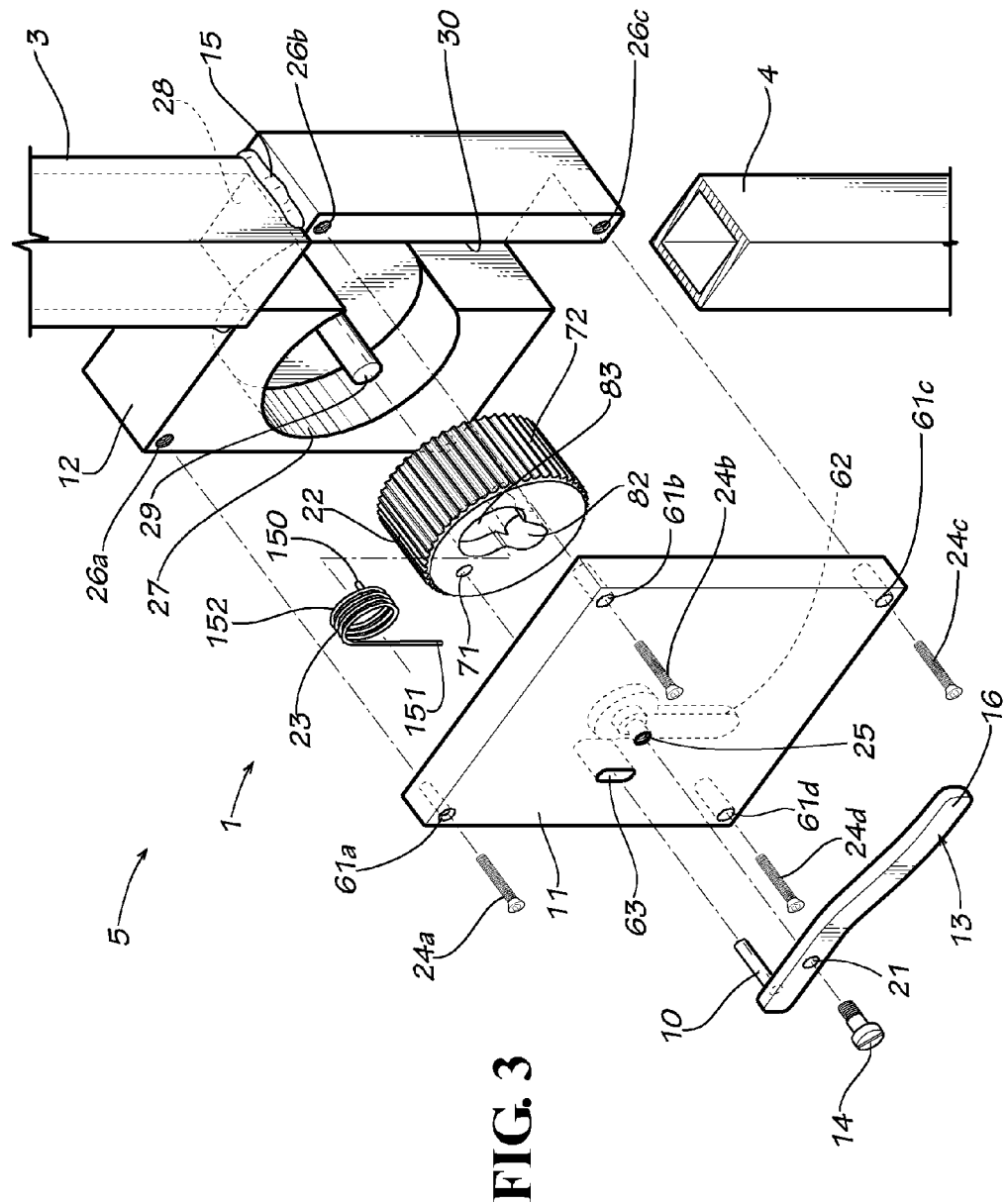
FIG. 3 is an exploded perspective view of the engagement apparatus of FIG. 1.

FIG. 3 displays an exploded perspective view of the leg assembly 5. The rigid member 4 is exploded downward to prevent obstruction of the parts of the engagement assembly 1. The upper leg tube 3 is shown attached to the device body housing 12 with welding 15. The device body housing 12 has four screw bores 26a,b,c,d that are threaded. Recessed in the device body housing 12 is a rigid member channel 28 and a rotation channel 27. A dowel 29 extends from the rotation channel 27. When the engagement assembly 1 is assembled, the rigid member 4 inserts inside the rigid member channel 28. The side of the rigid member channel 28 serves as a reinforcement 30 against lateral movement of the rigid member 4.

The rotating member 22 includes a rotation bore 81 (not visible in FIG. 3 but shown in FIG. 9), a bias attachment bore 82, a rotating member bias channel 83, an engagement surface 72, and a control release bore 71. When the engagement assembly 1 is assembled, the rotating member 22 is inserted inside the rotation channel 27 of the device body housing 12. The dowel 29 of the device body housing 12 extends through the rotation bore 81 of the rotating member 22. A biasing element 23 is shown including an axial lead 150, a radial lead 151 and a helical portion 152. When the engagement assembly 1 is assembled, the axial lead 150 of the biasing element 23 inserts into the attachment bore 82 of the rotating member 22. The helical portion 152 of the biasing element 23 inserts inside the rotating member bias channel 83 of the rotating member 22 and around the dowel 29 of the device body housing 12, which is extended through the rotating member 22. The radial lead 151 extends radially outward from the biasing element 23.

The cover 11 is shown including four relief holes 61a,b,c,d, a cover bias channel 62, a machine screw bore 25 that is threaded, and a relief arm bore 63. When the engagement assembly 1 is assembled, the radial lead 151 of the biasing element 23 rests in the cover bias channel 62. The attachment screws 24a,b,c,d are inserted through the relief holes 61a,b,c,d of the cover 11 and screwed into the screw bores 26a,b,c,d of the device body housing 12.

The control release 13 is shown including a relief hole 21, a lever arm 16, and an attachment finger 10 that operates as a control connector. The machine screw 14 is also shown. When the engagement assembly 1 is assembled, the attachment finger 10 is inserted through the relief arm bore 63 of the cover 11 and into the control release bore 71 of the rotating member 22. The machine screw 14 is inserted through the relief hole 21 of the control release 13 and screwed into the machine screw bore 25 of the cover 11.

Figure 4:
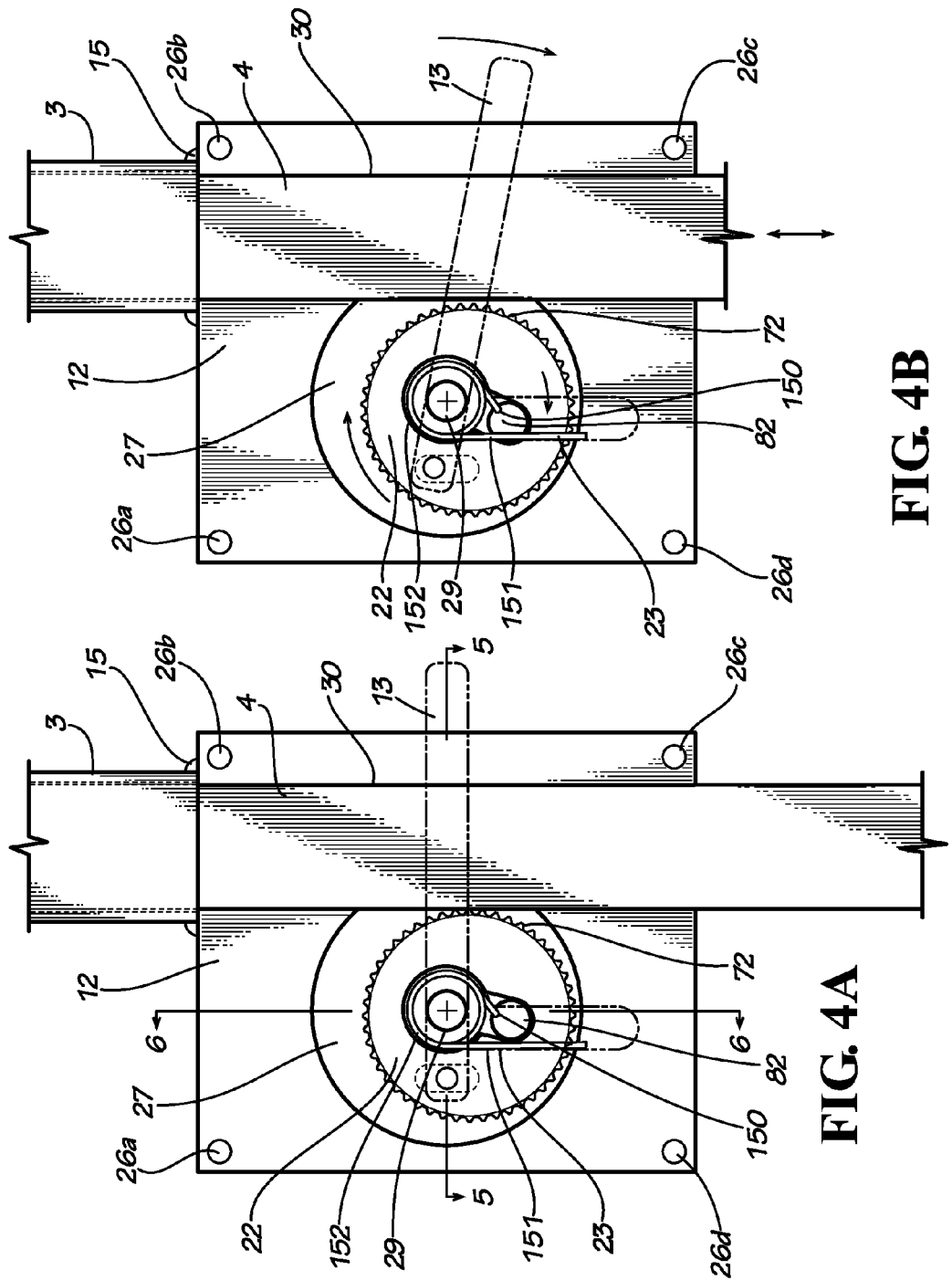
FIG. 4A is an outer side view of the engagement apparatus of FIG. 1 with a cover removed in an engaged position.
FIG. 4B is an outer side view of the engagement apparatus of FIG. 1 with a cover removed in a released or disengaged position.

FIG. 4A is an outer side view of the leg assembly 5 in its engaged position. Although the engagement assembly 1 is shown without its cover 11, dotted lines represent the control release 13 and the relief arm bore 63 of the cover 11.

FIG. 4B is the outer side view of the engagement assembly 1 shown in the disengaged position. The control release 13 is moved, the rotating member 22 is rotated away from the rigid member 4, and the rigid member 4 is no longer engaged.

Figure 5:
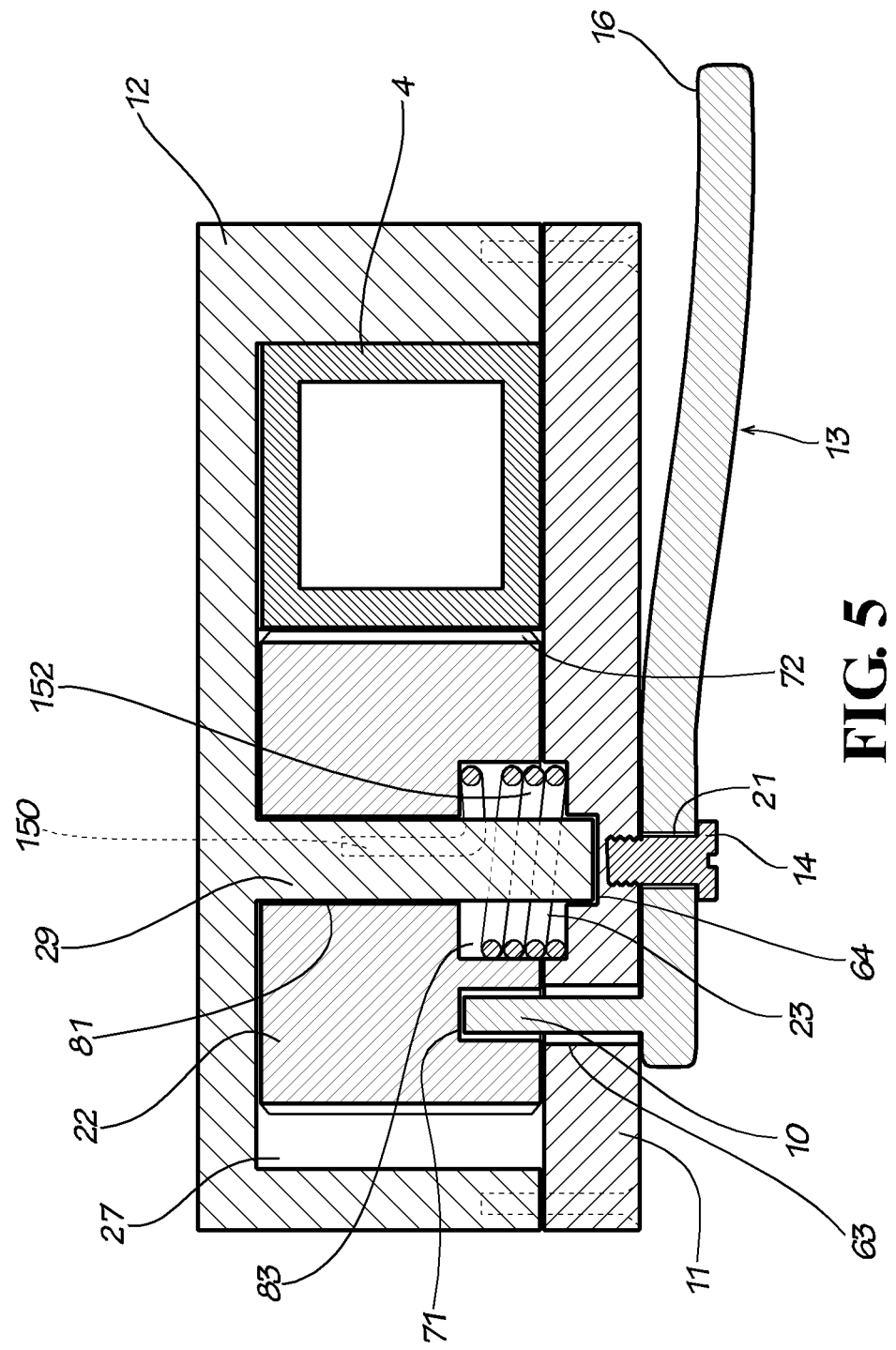
FIG. 5 is a sectional view of the engagement apparatus of FIG. 1 taken in the plane indicated by line 5 in FIG. 4A, and showing the cover and control release.
Figure 6:
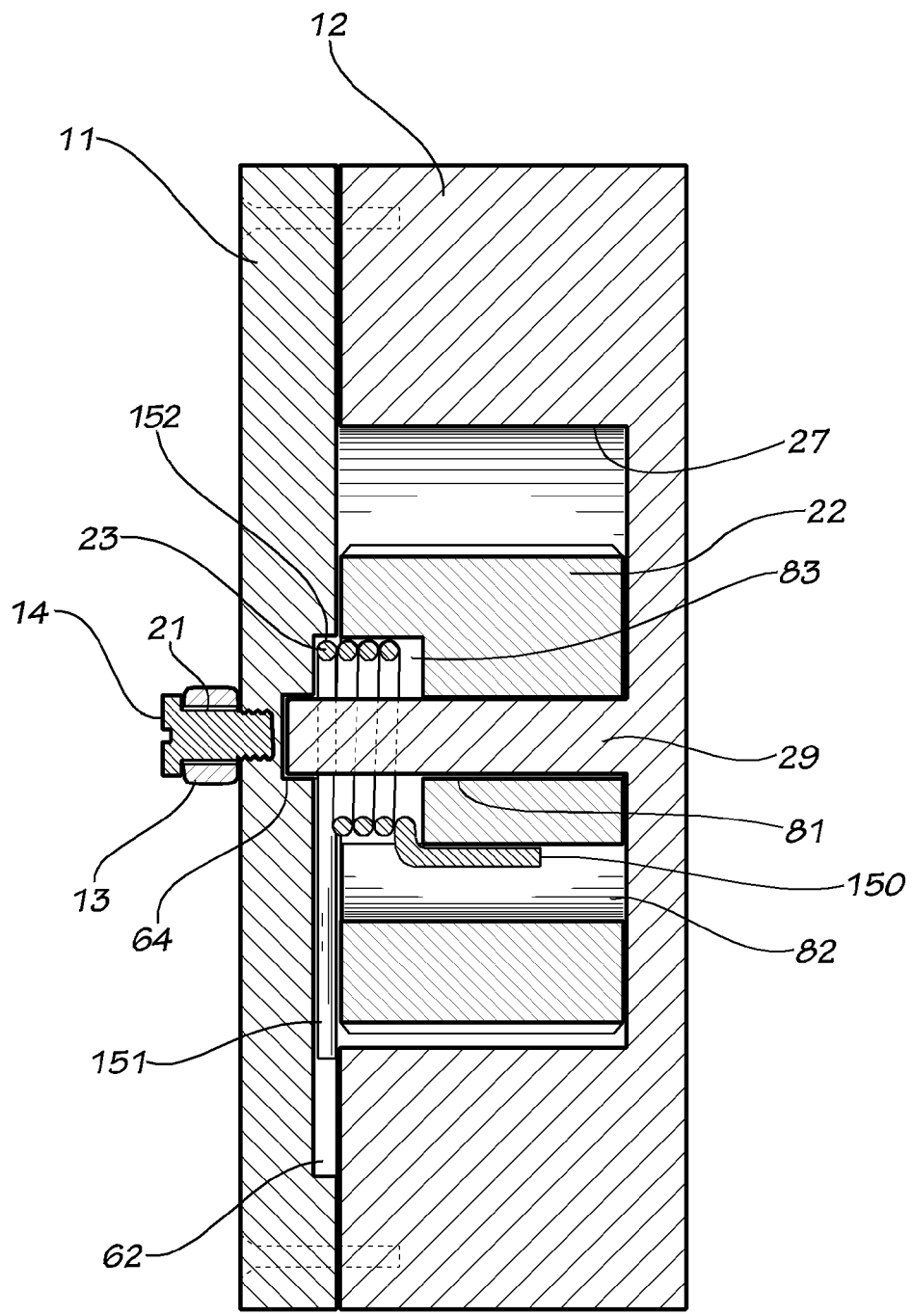
FIG. 6 is a sectional view of the engagement apparatus of FIG. 1 taken in the plane indicated by line 6 in FIG. 4A, and showing the cover and control release.

FIG. 5 is a cutaway view of the engagement assembly 1 showing the interaction of the cover 11, device body housing 12, rigid member 4, rotating member 22, dowel 29, biasing element 23, control release 13, and machine screw 14. FIG. 6 is a cutaway view of the engagement showing the interaction of the biasing element 23, rotating member 22, device body housing 12, dowel 29, cover 11, control release 13, and machine screw 14.

Figure 7:
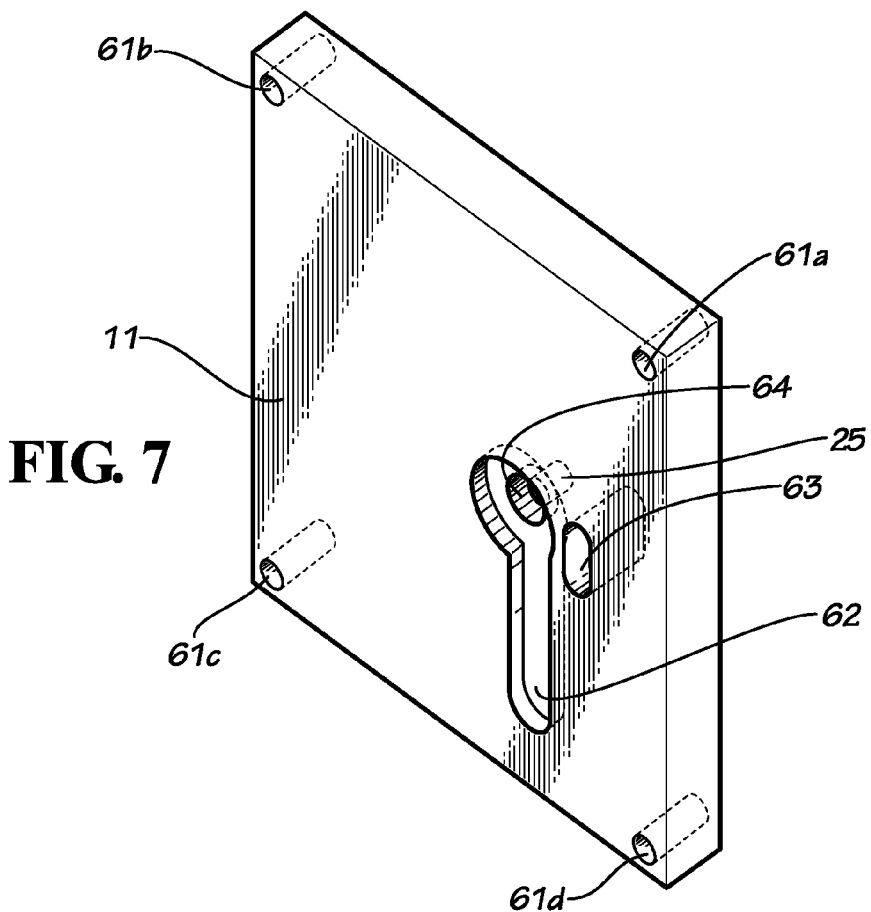
FIG. 7 is a perspective view of the cover of the engagement apparatus of FIG. 1.
Figure 8:
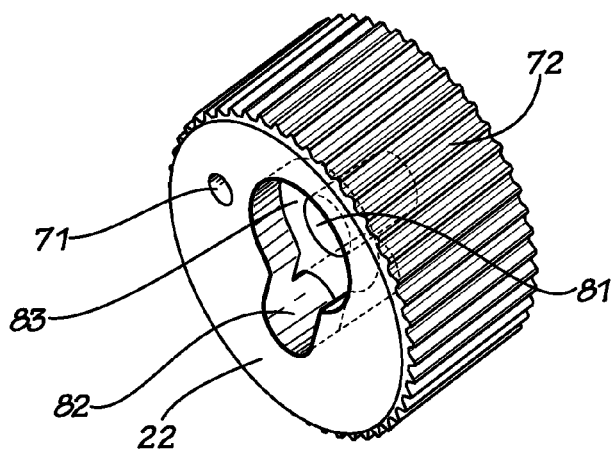
FIG. 8 is a perspective view of the rotating member of the engagement apparatus of FIG. 3.
Figure 9:
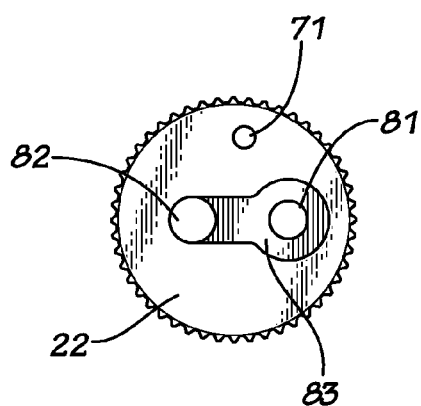
FIG. 9 is a side view of the rotating member of the engagement apparatus of FIG. 3.

FIG. 7 displays the cover 11, including four relief holes 61a,b,c,d, the relief arm bore 63, the cover bias channel 62, and a dowel collar 64. The dowel collar 64 is cut inside the bias channel 62. When the engagement assembly 1 is assembled, the dowel 29 extends into and rests inside the dowel collar 64 of the cover 11. The dowel collar 64 need not be located within the cover bias channel 62. FIG. 8 and FIG. 9 display the rotating member 22 including the control release bore 71, the engagement surface 72, the rotation bore 81, the bias attachment bore 82, and the rotating member bias channel 83.

Figure 11:
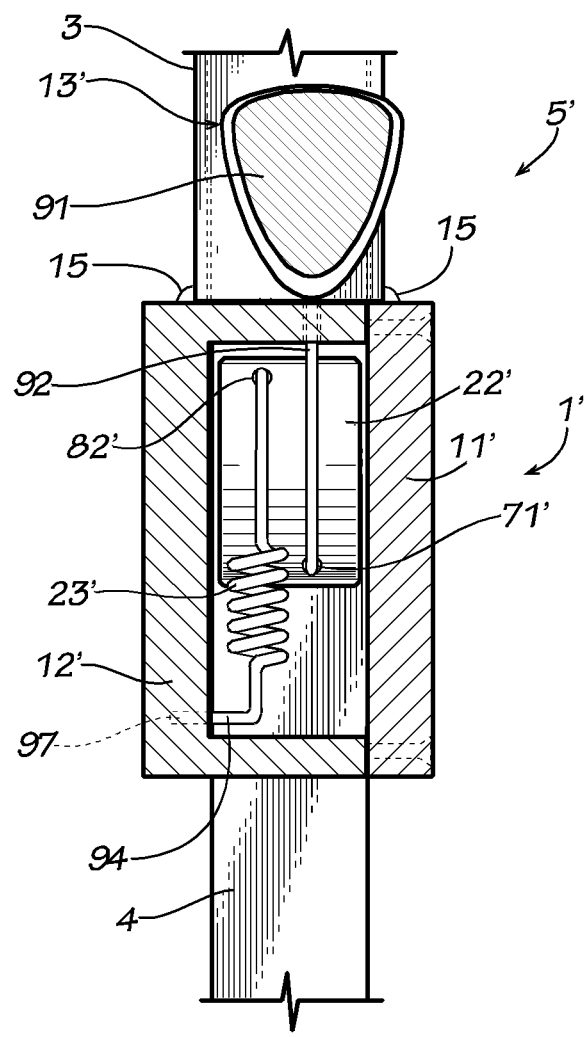
FIG. 11 is a section view of the engagement apparatus of FIG. 10A taken in the plane indicated by line 11 in FIG. 10A, and showing the cover.

FIGS. 10A, 10B and 11 show a second embodiment of the disclosure. In this embodiment, the upper leg tube 3 is attached to a device body housing 12' with welding 15'. The rigid member 4 telescopes inside an engagement assembly 1' and upper leg tube 3, altogether forming a leg assembly 5'. The device body housing 12' includes four screw bores 26a', b',c',d' that are threaded, a rigid member channel 28', a rotation channel 27', a control release bore 71', a dowel 29' extending into the rotation channel 27', a relief arm bore 96, a device body housing bias bore 97, and a bias relief channel 98. The outer wall of the rigid member channel 28' serves as a reinforcement 30'. A rotating member 22' includes an engagement surface 72', a rotation bore 81', a control release bore 71', and an attachment bore 82'. A control release 13' includes a control release handle or pull-bob 91 attached to a flexible wire lead 92 that acts as a control connector. A biasing element 23' is a linear spring and has a rotating member attachment portion 93 and a device body housing attachment portion 94.

When assembled, the rigid member 4 is inserted into the rigid member channel 28' of the device body housing 12'. The rotating member 22' is recessed into the rotation channel 27' of the device body housing 12' with the dowel 29' extending through the rotation bore 81' of the rotating member 22'. The rotating member attachment portion 93 of the linear spring biasing element 23' is attached to the rotating member 22' in the attachment bore 82'. The device body housing attachment portion 94 of the biasing element 23' is attached to the device body housing 12' in the device body housing bias bore 97. The flexible wire lead 92 of the control release 13' extends through the device body housing 12' in the relief arm bore 96. The flexible wire lead 92 of the control release 13' has an attachment portion 95 which is inserted into the control release bore 71' of the rotating member 22'.

FIG. 11 shows the interaction of the cover 11', the device body housing 12' which includes the device body housing bias bore 97, the biasing element 23', the rotating member 22' which includes the attachment bore 82' and the relief arm bore 71', and the control release 13' which includes the flexible wire lead 92 and the pull-bob 91. The rigid member 4 is shown in the background.

The first embodiment of the engagement assembly 1 is shown in FIGS. 1 through 9. With reference to those FIGs, when the engagement assembly 1 is implemented, the engagement surface 72 of the rotating member 22 engages the rigid member 4, as shown in FIG. 4A. The rotating member 22 of this embodiment is an eccentric disc including a knurled or toothed engagement surface 72 to promote friction. The rigid member 4 has a square cross section and a smooth surface in this embodiment.

The radial lead 151 of the biasing element 23 is attached to the cover 11 in the cover bias channel 62, allowing the cover 11 to serve as an anchor for the biasing element 23. The axial lead 150 of the biasing element 23 is attached to the rotating member 22. The biasing element 23, being attached to both the cover 11 and the rotating member 22, is configured to impart a torque—and thereby a rotational bias around the dowel 29—on the rotating member 22 and toward the rigid member 4. Because the rotating member 22 is eccentric, its rotation in the biased direction allows the engagement surface 72 to approach the rigid member 4, contacting it. When biased into the rigid member 4, the rotating member 22 engages the rigid member 4. When the rotating member 22 engages the rigid member 4, the reinforcement 30 of the device body housing 12 supports the rigid member 4 in the opposite direction of the force applied by the rotating member 22, resulting in a gripping effect of the rotating member 22 on the rigid member 4 to secure the rigid member 4 by friction. The reinforcement 30 is a flat wall integrated into the device body housing 12 such that the rigid member 4 may move in the rigid member channel 28 between the rotating member 22 and the flat wall reinforcement 30. When the cover 11 is attached to the device body housing 12, the dowel 29 fits into the dowel collar 64 so that any force on the rotating member 22 can be placed on both the device body housing 12 and the cover 11 through the integration of the dowel 29 with the device body housing 12 and the attachment of the dowel 29 with the dowel collar 64.

The rigid member channel 28 of the device body housing 12 is configured to allow the rigid member 4 to retract into the upper leg tube 3, extend out of the upper leg tube 3, or remain stationary. When the engagement assembly 1 is in the engaged position, as seen in FIG. 4A, the rotating member 22 continues to grip the rigid member 4 when the rigid member 4 is stationary. When the engagement assembly 1 is used within a platform or chair, weight of the chair 2 or force applied to the chair 2 biases the rigid member 4 toward retraction within the upper leg tube 3. However, the eccentric profile of the rotating member 22 promotes tightening of the engagement of the rigid member 4 as the refraction bias on the rigid member 4 increases. The weight placed on the chair 2 thereby increases the gripping engagement of the rigid member 4 by the rotating member 22 further preventing movement of the rigid member 4. Likewise, the eccentric profile of the rotating member 22 also promotes loosening of the engagement of the rigid member 4 as retraction bias on the rigid member 4 decreases. Downward force placed on the rigid member 4 to promote extension of the rigid member 4 out of the upper leg tube 3 and the engagement assembly 1 thereby decreases the gripping engagement of the rigid member 4 by the rotating member 22 and may allow the rigid member 4 to move in one direction without a complete disengagement of the rotating member 22 from the rigid member 4.

To allow free motion of the rigid member 4 within the rigid member channel 28 of the device body housing 12, the engagement of the rotating member 22 into the rigid member 4 is releasable. The release of the engagement is controlled by a control release 13 that opposes the bias of the biasing element 23. In this first embodiment, seen in FIGS. 1 through 9, the control release 13 is operably attached to the rotating member 22. The control release 13 is rotably connected to the cover 11 by the machine screw 14. The rotable connection is achieved by the control release 13 having the relief hole 21 through which the machine screw 14 is inserted but not mechanically coupled, allowing the control release 13 to pivot around the machine screw 14. The attachment finger 10 of the control release 13 extends through the relief arm bore 63 of the cover 11 and attaches to the rotating member 22 in the control release bore 71. Through the attachment of the attachment finger 10 of the control release 13 to the rotating member 22, the pivot action of the control release 13 torques the rotating member 22.

The control release 13 may be pivoted to mechanically move the rotating member 22 in the opposite direction of the bias placed on the rotating member by the biasing element 23. Force on the lever arm 16 of the control release 13 will provide torque for the control release 13, which will be imparted on the rotating member 22 through the connection of the attachment finger 10 of the control release 13. If sufficient torque is applied to the control release 13 to fully oppose the biasing element 23, the reverse of the bias disengages the rotating member 22 from the rigid member 4 at the engagement surface 72, as seen in FIG. 4B. The disengagement allows the rigid member 4 freedom to move within the rigid member channel 28 of the device body housing 12. This motion allows the rigid member 4 to be retracted into the upper leg tube 3, when it could not be retracted in the engaged position of FIG. 4A, or freely extended from the upper leg tube 3, when its extension was restricted in the engaged position of FIG. 4A.

In the second embodiment, the rotating member 22' engages the rigid member 4 being biased by the biasing element 23' as shown in FIG. 10A, FIG. 10B, and FIG. 11. The biasing element 23' is a linear spring having two leads. The biasing element 23' is attached by the device body housing attachment portion 94 to the device body housing 12' in the device body housing bias bore 97. The rotating member attachment portion 93 of the biasing element 23' is attached to the rotating member 22' in the bias attachment bore 82'. The control release 13' includes a control release handle or pull-bob 91 and flexible wire lead 92 operably attached to the rotating member 22', having the control release lead 92 inserted into the control release bore 71' of the rotating member 22'. When the pull-bob 91 of the control release 13' is actuated by being pulled upward, the control release 13' opposes the bias of the biasing element 23'. If sufficient force is applied to the control release 13' to overcome the bias of the biasing element 23', the rotating member 22' rotates away from the rigid member 4, disengaging the rotating member 22' from the rigid member 4.

In both sample embodiments, the engagement assembly 1 or 1' is enclosed by the cover 11 or 11' and device body housing 12 or 12' which are attached using screws 24a,b,c,d that are screwed into the threaded screw bores 26a,b,c,d of the device body housing 12 or 12' after passing through the relief holes 61a,b,c,d of the cover 11 or 11'.

Other embodiments of the disclosure include attaching the device 1 to legged platforms other than chairs, integrating the disclosure within the platform itself, and the disclosure included to stop movement of a rigid member without a platform, among other possibilities. Although FIG. 1 displays the rigid member telescoping inside the chair leg, the disclosure is not limited to this application, and could be applied to a rigid member moving outside of a chair leg, among other embodiments. The control release 13 may include switches, lever arms, strings, and buttons, among others. The reinforcement 30 need not be mechanically attached or integrated with the device body housing 12. The cross-section of the rigid member 4 could be circular, square, triangular, rectangular, oval, polygonal, flat, curved, or toothed, among other possible embodiments. Other advantageous surface textures of the rigid member 4 include rough, smooth, and mating or toothed, among others. Although not present in the sample embodiments, the surface texture of the rigid member 4 could mate with the engagement surface 72 of the rotating member 22 by friction or mechanical interference. One example of mechanical mating surfaces, among others, includes the rotating member 22 and rigid member 4 having interlocking toothed surfaces. Use of the term "rigid" is not intended to connote any particular physical properties of the rigid member 4, the cover 11, or device body housing 12 of the device housing other than resistance to complete deformation. "Rigid" materials could include materials that, although not necessarily impervious, are also not fully undeformable, such as wood, various plastics, various metals, and other similar materials. The rigid member 4 could be straight, curved, or of another shape sufficient to be engaged by the rotating member 22. The biasing element 23 could be of many configurations, including among others gravitational biasing; other types of springs including flat springs, helical springs and elastic or elastic-propertied materials, among other springs; and magnetic bias. The biasing element 23 need not be attached to the cover 11 or device body housing 12 of the device housing, and can instead be attached externally to the disclosed device 1 or elsewhere within the device 1. The reinforcement 30 could be any type of structure to oppose motion of the rigid member 4, including among other possibilities a set of at least two dowel pins, a planar surface, a combination of pins and planar surfaces, a rounded surface, or another device, including among other possibilities a second implementation of the claimed device 1, in any configuration. The device body housing 12 need not include a dowel 29. Other types of rotation axes include a fulcrum, a ball, and a pivot, among others. Moreover, although the sample embodiment includes a dowel 29 integrated into the device body housing 12, the dowel 29 could be a separate dowel pin attached to the device body housing 12. The engagement surface 72 could be rough, smooth, toothed, knurled, or another surface promoting friction or mechanical interference. The rotating member 22 could be a multitude of shapes, including rounded or disc-like, oblong, or curvilinear, among other embodiments. The rotating member 22 could also include a rigid arm having an engagement surface 72 distal to its axis of rotation. The axis of rotation of the rotating member 22 could be located within, tangential to, or outside of the boundaries of the rotating member 22. Although the sample embodiments include covers 11 and 11' and device body housings 12 and 12', the device housing could be one piece, more than 2 pieces, or completely absent in other embodiments of the disclosure. Other types of attachment could include adhesives, welding, key-fit attachments, and friction fits, among others.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any physical properties described above should be understood as representing one of many possible embodiments, and alternate implementations are included depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. An apparatus for releasably engaging a rigid member, the apparatus comprising:
    a rotating member rotating about a dowel in a housing; wherein the rotating member is rounded;
    a biasing element directly connected to and positioned at least partially within the rotating member to bias the rotating member to rotate toward the rigid member to prevent movement of the rigid member in at least one direction; and
    a control release connected to and positioned at least partially within the rotating member to reverse bias the rotating member to rotate away from the rigid member to enable movement of the rigid member in the at least one direction.

2. The apparatus of claim 1, wherein the rotating member includes a friction-inducing engagement surface.

3. The apparatus of claim 2, wherein the friction-inducing engagement surface is rough.

4. The apparatus of claim 2, wherein the friction-inducing engagement surface is knurled.

5. The apparatus of claim 1, wherein the rotating member is an eccentric.

6. The apparatus of claim 1, wherein the control release includes a pull bob handle attached to the rotating member with a lead wire, wherein the pull bob handle is actuated linearly.

7. The apparatus of claim 1, wherein the control release includes a lever arm operably attached to the rotating member.

8. The apparatus of claim 1, wherein the housing encloses the biasing element.

9. The apparatus of claim 8, wherein at least a portion of the control release is located outside of the housing and attaches to the rotating member by a control connector.

10. The apparatus of claim 9, wherein the control connector includes an attachment finger extending into a bore in the rotating member.

11. The apparatus of claim 9, wherein the control connector includes a flexible lead wire connected to the rotating member.

12. An apparatus for elevating an object a distance from the ground comprising:
    a platform;
    at least one leg supporting the platform a distance from the ground, the at least one leg including an upper leg portion and a lower leg portion, the lower leg portion configured to extend and retract with respect to the upper leg portion; and
    an extension and retraction apparatus including
    a rotating member rotating about a dowel in a housing; wherein the rotating member is rounded;

a biasing element directly connected to and positioned at least partially within the rotating member to bias the rotating member to rotate toward the at least one leg to prevent movement of the at least one leg in at least one direction; and a control release connected to and positioned at least partially within the rotating member to reverse bias the rotating member to rotate away from the at least one leg to enable movement of the at least one leg in the at least one direction.

13. The apparatus of claim 12, wherein the rotating member includes a friction-inducing engagement surface.

14. The apparatus of claim 13, wherein the friction-inducing engagement surface is rough.

15. The apparatus of claim 13, wherein the friction-inducing engagement surface is knurled.

16. The apparatus of claim 12, wherein the lower leg portion is moveable inside a rigid member channel.

17. The apparatus of claim 12, wherein the rotating member is an eccentric.

18. The apparatus of claim 12, wherein the control release includes a pull bob handle attached to the rotating member with a lead wire, wherein the pull bob handle is actuated linearly.

19. The apparatus of claim 12, wherein the control release includes a lever arm operably attached to the rotating member.

20. The apparatus of claim 12, wherein the housing encloses the biasing element.

21. The apparatus of claim 20, wherein at least a portion of the control release is located outside of the housing and attaches to the rotating member by a control connector.

22. The apparatus of claim 21, wherein the control connector includes an attachment finger extending into a bore in the rotating member.

23. The apparatus of claim 21, wherein the control connector includes a flexible lead wire connected to the rotating member.

* * * * *